(12) United States Patent
Larsson et al.

(10) Patent No.: US 9,167,540 B2
(45) Date of Patent: *Oct. 20, 2015

(54) USER TERMINAL POWER SHORTAGE INDICATION

(75) Inventors: Kjell Larsson, Lulea (SE); Eva Englund, Linkoping (SE); Peter Okvist, Lulea (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 353 days.

This patent is subject to a terminal disclaimer.

(21) Appl. No.: 12/667,389

(22) PCT Filed: Jul. 4, 2007

(86) PCT No.: PCT/SE2007/050493
§ 371 (c)(1),
(2), (4) Date: Dec. 31, 2009

(87) PCT Pub. No.: WO2009/005429
PCT Pub. Date: Jan. 8, 2009

(65) Prior Publication Data
US 2010/0182940 A1    Jul. 22, 2010

(51) Int. Cl.
*G08C 17/02* (2006.01)
*H04W 52/36* (2009.01)
*H04B 17/345* (2015.01)
(Continued)

(52) U.S. Cl.
CPC ........... *H04W 52/365* (2013.01); *H04B 17/345* (2015.01); *H04W 52/283* (2013.01); *H04W 52/343* (2013.01); *H04W 52/346* (2013.01)

(58) Field of Classification Search
CPC ..................... G08C 2201/10; G08C 2201/114; G08C 17/02; H04J 3/02; H04J 3/22; H04J 3/16; H04J 3/00
See application file for complete search history.

(56) References Cited

U.S. PATENT DOCUMENTS 6,735,447 B1 * 5/2004 Muller .......................... 455/522
2002/0009061 A1 * 1/2002 Willenegger ................. 370/328
(Continued)

FOREIGN PATENT DOCUMENTS

GB    2407233 A    4/2005
JP    2007053589 A    3/2007
(Continued)

OTHER PUBLICATIONS

3rd Generation Partnership Project. "E-TFC Selection and Reporting of UE Power Situation." TSG-RAN Working Group 4 (Radio) meeting #34, R4-050080, Scottsdale, US, Feb. 14-18, 2005.
(Continued)

*Primary Examiner* — Anez Ebrahim
(74) *Attorney, Agent, or Firm* — Patent Portfolio Builders, PLLC (57) ABSTRACT

The present invention relates to methods, a user equipment and a communication network node for efficiently utilizing radio resources in a communication system comprising said communication network node (15) serving cells (19) between which one or more user equipment (18) is moving. When a user equipment (18) detects a power shortage situation it is arranged to transmit a report, such as a scheduling information signalling, triggered by the power shortage situation, whereby the communication network node is allowed to take a pre-determined action regarding the available radio resources.

16 Claims, 4 Drawing Sheets

(51) Int. Cl.
*H04W 52/28* (2009.01)
*H04W 52/34* (2009.01)

(56) References Cited

U.S. PATENT DOCUMENTS

| | | | |
|---|---|---|---|
| 2002/0094832 A1* | 7/2002 | Lee ................................ | 455/522 |
| 2003/0232624 A1 | 12/2003 | Toskala et al. | |
| 2004/0223455 A1 | 11/2004 | Fong et al. | |
| 2005/0048963 A1* | 3/2005 | Kubler et al. .................. | 455/423 |
| 2006/0013268 A1 | 1/2006 | Terry | |
| 2006/0221923 A1* | 10/2006 | Usuda et al. .................. | 370/338 |
| 2008/0311961 A1* | 12/2008 | Cotevino et al. .............. | 455/574 |
| 2009/0010229 A1* | 1/2009 | Kazmi et al. .................. | 370/336 |
| 2010/0220606 A1* | 9/2010 | Niwano ......................... | 370/252 |

FOREIGN PATENT DOCUMENTS

| | | |
|---|---|---|
| WO | 2006019562 A2 | 2/2006 |
| WO | 2006066631 A1 | 6/2006 |
| WO | 2007021115 A1 | 2/2007 |
| WO | 2008115660 A1 | 9/2008 |

OTHER PUBLICATIONS

3rd Generation Partnership Project. "3GPP TS 25.321, V7.4.0 (Mar. 2007)." 3rd Generation Partnership Project; Technical Specification Group Radio Access Network; Medium Access Control (MAC) protocol specification (Release 7).

3GPP, Technical Specification Group Radio Access Network; Enhanced uplink; Overall description; Stage 2 (Release 7), 3GPP TS 25.319 V7.2.0, Mar. 1, 2007, pp. 27-34, Sophia Antipolis Valbonne, France.

* cited by examiner

USER TERMINAL POWER SHORTAGE INDICATION

TECHNICAL FIELD

The present invention relates to methods, a user equipment and a communication network node in a communication system and more particularly to a user equipment and a communication network node allowing for efficiently utilizing radio resources as well as methods for such utilization.

BACKGROUND

In release 6 of the 3GPP WCDMA specifications, the support for high speed packet data in the uplink has been improved with a new uplink transport channel, Enhanced Dedicated Transport Channel (E-DCH). The E-DCH supports higher data rates, Node B HARQ with soft combining and a fast Node B scheduling.

With the new scheduling functionality, the Node B can limit the maximum rate that a UE may use by issuing "grants" to the UE. However, as the Node B is not aware of the detailed buffer status or the available power in the UE, the final rate selection resides in the UE. The system and functionality description for the Enhanced uplink describes the mechanism for the rate selection in the UE. Basically the UE should use the minimum rate selected among the issued grant, "system granted rate" or "UE evaluated maximum rate based on power consumptions".

When the UE is limited by its own maximum Tx power, it has to evaluate which rate it can support (the UE does this evaluation all the time in order to find out whether it is power or grant limited) in order not to end up in a power shortage situation. With a power shortage situation is meant that the UE does not have enough power to transmit a selected transport format, E-TFC, with the intended power. This means that the UE has overestimated the rate, that can be supported and the transport block is transmitted with lower power than what is configured. As a consequence the probability that the transmission cannot be detect correctly is increased and additional transmissions may be needed.

When the UE starts to experience power shortage, the long term (and preferred) solution is to change the used E-TFC so that the available power is enough for a proper transmission. This action takes some TTIs to accomplish. During this execution time, the UE starts to temporarily reduce the power allocation to the Enhanced data channel (E-DPDCH).

The UE rate selection (E-TFC selection) is based on the power used for the control channel (DPCCH) together with power offset values for each existing transport format (E-TFC), i.e. $\beta_{ed}$. Based on the DPCCH power and $\beta_{ed}$'s, the UE evaluates which E-TFC it can support. The intermediate temporal power reduction is carried out by reducing the $\beta_{ed}$ factor on slot basis.

For the UE to request resources from the Node B(s), scheduling requests are transmitted in the uplink in the form of Scheduling Information (SI) and Happy Bit. The SI will be transmitted for the logical channels configured so that reporting has to be made, while the Happy Bit always should be included in the E-DPCCH, whenever the E-DPCCH is transmitted.

The SI is located at the end of the MAC-e PDU and is used to provide the serving Node B with a better view of the amount of system resources needed by the UE and the amount of resources the UE actually can make use of.

The UE includes the following in the Scheduling Information: 'Logical channel ID of the highest priority channel with data in buffer (HLID, 4 bits)'; 'Total E-DCH Buffer Status (TEBS, 5 bits), 'Highest priority Logical channel Buffer Status' (HLBS, 4 bits); and 'UE Power Headroom (UPH, 5 bits)', i.e. this field indicates the ratio of the maximum UE transmission power and the corresponding DPCCH code power.

The reported UE transmission power headroom measurement result shall be an estimate of the average value of the UE transmission power headroom over a 100 ms period.

According to current procedures, the SI will be reported to the Node B following some criterion. In the case where the UE is not allowed to transmit scheduled data (because it has no serving grant available or it has received an absolute grant preventing it from transmitting in any process) and it has scheduled data to send on a logical channel for which SI must be reported the serving E-DCH RLS in a MAC-e PDU:

Periodic reporting to protect against NACK-to-ACK misinterpretation;

Scheduling information could be sent alone, or with non-scheduled data, if such exist;

Scheduling information will also be triggered if higher priority data arrives in buffer.

From a "not wasting system resources" point of view, the scenario where the UE is allowed to transmit scheduled data and has scheduled data to send on a logical channel for which SI must be reported but do not have enough power left, is important to handle.

Using today's solution for selecting when a SI (UPH information) should be triggered, there is no mechanism that takes the UE's power situation into consideration, nor it is possible for the UE to decide when to inform the system (Node B) about the current situation.

Not having this information, the Node B cannot have updated information on the local power demand (interference situation), and risks to waste system capacity. For example, during the temporary power reduction of the E-DPDCH, retransmission(s) will trigger repeated increases of the SIR-target through the Outer-Loop Power Control (OLPC), thus wasting capacity and end-user throughput. Additionally, the Node B might give grant to a UE that cannot make use of it.

SUMMARY

Accordingly, it is an objective with the present invention to provide an improved method in a user equipment of efficiently utilizing radio resources in a communication network comprising at least one communication network node serving cells between which one or more user equipments are moving.

According to a first aspect of the present invention this objective is achieved through a method as defined in claim 1, which specifies that radio resources in a communication network are efficiently utilized by detecting a power shortage situation in said user equipment and transmitting a report triggered by said power shortage situation to said communication network node so as to allow said communication network node to take a pre-determined action regarding the available radio resources.

Another objective with the present invention is to provide an improved method in a communication network node of efficiently utilizing radio resources in a communication network comprising at least one communication network node serving cells between which one or more user equipments are moving.

According to a second aspect of the present invention this other objective is achieved through a method as defined in claim 4, which specifies that radio resources in a communication network are efficiently utilized by receiving a report triggered by a power shortage situation in a user equipment and taking a pre-determined action regarding the available radio resources.

A further objective with the present invention is to provide an improved user equipment for efficiently utilizing radio resources in a communication network comprising at least one communication network node serving cells between which said user equipment is moving.

According to a third aspect of the present invention this further objective is achieved through a user equipment as defined in claim 10, which specifies that radio resources in a communication network are efficiently utilized by a user equipment comprising means for detecting a power shortage situation and means for transmitting a report triggered by said power shortage situation to said communication network node so as to allow said communication network node to take a pre-determined action regarding the available radio resources.

A still further objective with the present invention is to provide an improved communication network node for efficiently utilizing radio resources in a communication network comprising said communication network node serving cells between which one or more user equipment is moving.

According to a fourth aspect of the present invention this still further objective is achieved through a communication network node as defined in claim 14, which specifies that the communication network node comprises means for receiving a report triggered by a power shortage situation in a user equipment and means for taking a pre-determined action regarding the available radio resources.

Further embodiments are listed in the dependent claims.

Thanks to the provision of methods, a user equipment and a communication network node, which use a power shortage triggered signaling, the communication network node will have information on the power situation of the user equipment and can thus interpret the situation and take correct actions and utilize the scarce interference resource more efficiently and, thus, improving system capacity. Further, an outer-loop power control algorithm having information of power shortage might also take benefit of not increasing the SIR-target in situations when the UE cannot meet-up an increase demand.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

Figure 1:
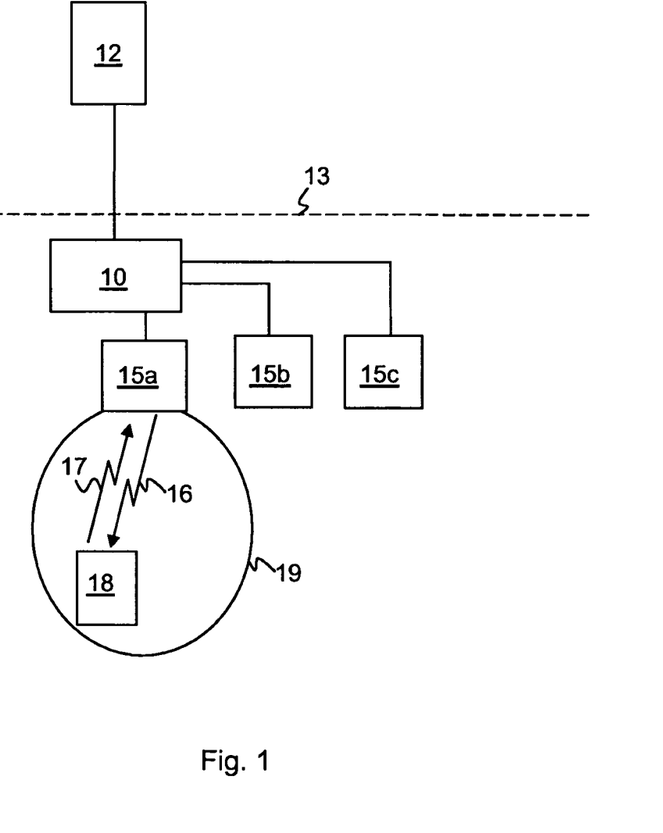
FIG. 1 shows the communication network architecture according to the present invention.

FIG. 1 depicts a communication system, such as a Wideband Code Division Multiple Access (WCDMA) system, including a Radio Access Network (RAN), such as the UMTS Terrestrial Radio Access Network (UTRAN) architecture, comprising at least one Radio Base Station (RBS) (or Node B or eNode B) 15a-c, connected to a Radio Network Controller (RNC) 10. The RAN is connected over an interface 13, such as the Iu-interface, to a Core network (CN) 12, which may be a connection-oriented external CN such as the Public Switched Telephone Network (PSTN) or the Integrated Services Digital Network (ISDN), and/or a connectionless external CN as the Internet.

The RAN and the CN 12 provide communication and control for a plurality of user equipments (UE) 18 (only one shown in FIG. 1). The UEs 18 each uses downlink (DL) channels 16 (i.e. base-to-user or forward) and uplink (UL) channels 17 (i.e. user-to-base or reverse) to communicate with at least one RBS 15 over a radio or air interface. Each RBS 15a-c serves at least one cell 19 in which the UEs 18 are situated or through which the UEs 18 are moving.

According to a preferred embodiment of the present invention, the communication system is herein described as a WCDMA communication system. The skilled person, however, realizes that the inventive method and arrangement work very well on all communications system, such as the Global System for Mobile communications (GSM) or 3G Long Term Evolution (LTE) system. The user equipments 18 may be mobile stations such as mobile telephones ("cellular" telephones) and laptops with mobile termination and thus can be, for example, portable, pocket, hand-held, computer-included or car-mounted mobile devices which communicate voice and/or data with the RAN.

The basic idea of the present invention is to let the Scheduling Information (SI) signalling be triggered by UE power shortage; the RBS will by this have information on the UE power situation and can thus interpret the situation and take correct actions and utilize the scarce interference resource more efficiently.

Since the UE Power Headroom (UPH) should be used to provide the serving RBS with a better view of the amount of system resources needed by the UE and the amount of resources it can actually make use of, it should be beneficial to trigger a SI from the UE to the RBS on behalf of the UE's power shortage.

When the UE detects a power shortage through the E-TFC selection procedure, it shall transmit scheduling information to the RBS. Similarly, the UE may transmit another SI when the power shortage situation has been resolved. This means that the triggering criterions for SI are extended to include also power shortage situations.

The power shortage situation may be further signalled from the RBS to the Radio Network Controller (RNC). This is useful in case the Ue in is soft handover, i.e. the uplink transmission is received by several base stations. According to the current specifications the Outer Loop Power Control (OLPC) is situated in the RNC and the SIR target form the OLPC applies to all links that are involved in the reception. To avoid different SIR target in different cells it could be good to forward the power shortage situation to the RNC and the OLPC functionality in the RNC. The RNC can then apply the SIR target freeze to all links involved in the reception. The RNC can also take further actions to control inter-cell interference if power shortage situations are reported frequently.

Figure 2:
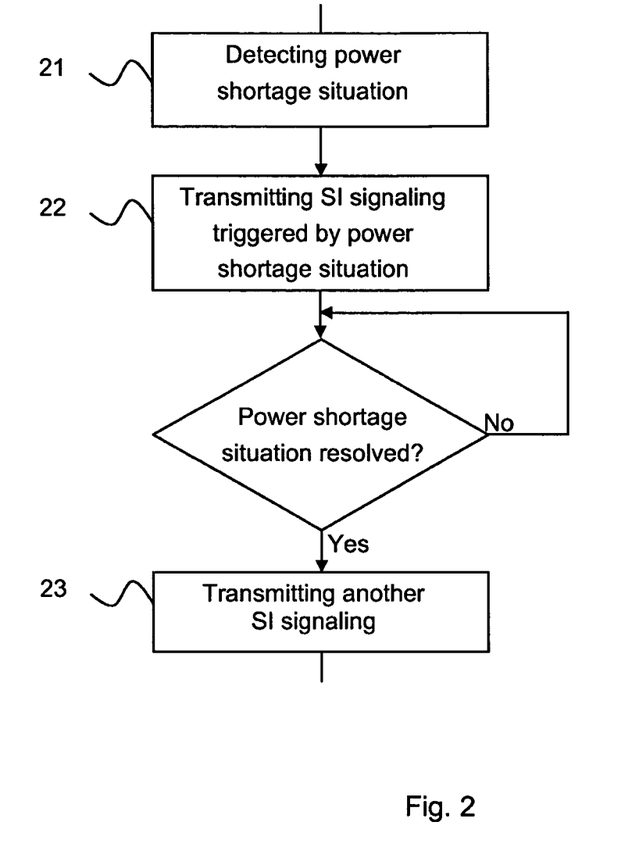
FIG. 2 is a flowchart over the inventive procedure steps in a user equipment.

Thus, according to a preferred embodiment of the present invention the procedure in the user equipment for efficiently utilizing radio resources in a communication network, shown in FIG. 2, is as follows:

1) detecting a power shortage situation in the user equipment (step 21);
2) transmitting a scheduling information signalling triggered by the power shortage situation to a communication network node (such as the RBS) so as to allow the communication network node to take a pre-determined action regarding the available radio resources (step 22);
3) transmitting scheduling information signalling to the communication network node when said power shortage situation has been resolved (step 23).

With the triggering of SI in power shortage periods, the RBS takes actions to avoid undesirable effects of power shortages.

Figure 3:
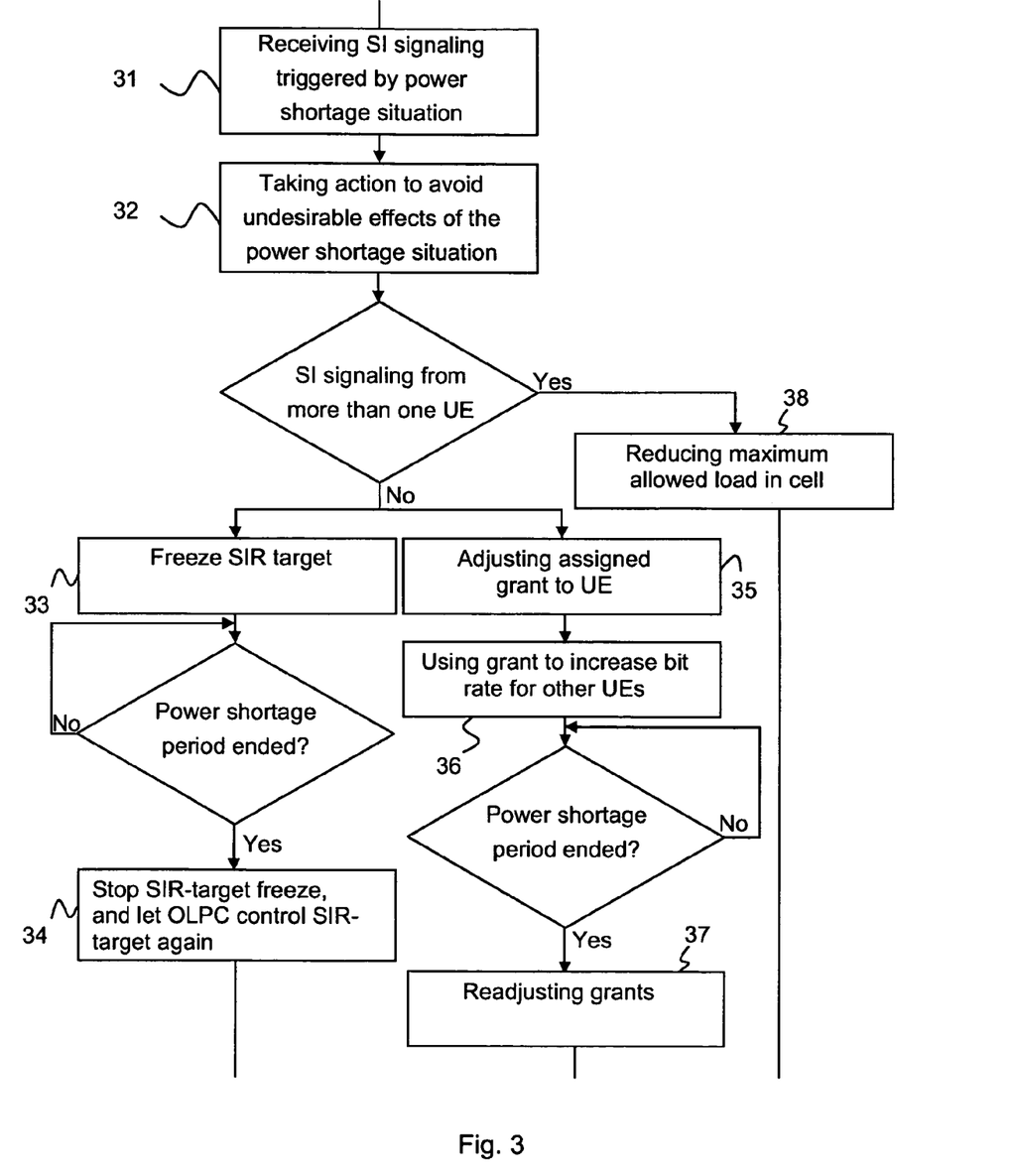
FIG. 3 is a flowchart over the inventive procedure steps in a communication network node.

Thus, according to a preferred embodiment of the present invention the procedure in the RBS for efficiently utilizing radio resources in a communication network, shown in FIG. 3, is as follows:
1) receiving a scheduling information signalling triggered by a power shortage situation in a user equipment (step 31);
2) taking a pre-determined action regarding the available radio resources (step 32) in order to avoid undesirable effects of the power shortage situation;
3) according to a first embodiment of the possible actions to perform, the RBS freezes the SIR-target during power shortage periods (step 33) to avoid unnecessary SIR-target increases. When the power shortage period has ended, the RBS stops the freezing of the SIR-target and lets the OLPC control the SIR target again (step 34);
4) according to a second embodiment of the possible actions to perform, the scheduler (shown in FIG. 4) of the RBS adjusts an assigned grant to the user equipment upon receiving said scheduling information signalling during a power shortage period (step 35), i.e. the RBS scheduler avoids assigning a higher grant or reduces the grant in case the current grant is too high compared to what the users can use due to the power situation, since the users anyway are limited by transmit power and cannot use the higher grant. The reduced grants may for example increase the scheduling headroom and result in increase bit rates for other users (step 36). When the power shortage period has ended, the scheduler readjusts the grants (step 37);
5) according to a third embodiment of possible actions to perform, the scheduler of the RBS reduces a maximum allowed load in the cell upon receiving said scheduling information signalling from more than one user equipment (step 38). If many users in the cell become power limited, this is further an indication that the interference in the cell needs to be reduced. The scheduler may then take action by reducing the maximum allowed load in the cell. Additionally, this information could be taken into consideration for load balancing purposes by any of the cells that the UE is connected to as well.

Figure 4:
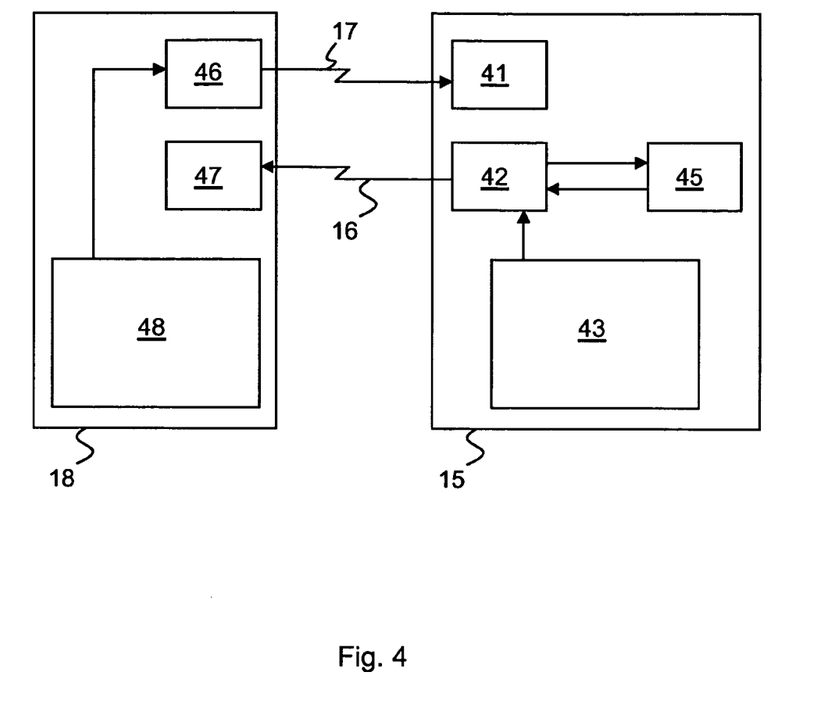
FIG. 4 is a block diagram illustrating a user equipment and a communication network node comprising the arrangement according to the present invention.

FIG. 4 is a block diagram showing the user equipment 18 and a radio base station 15 provided with the inventive arrangement. The user equipment 18 comprises a radio transmitter 46 arranged to transmit data to the receiver 41 of the RBS 15 over the radio interface on the uplink channel 17 and a receiver 47 arranged to receive data transmitted from the transmitter 42 of the RBS 15 on the downlink channel 16. The user equipment 18 further comprises means for detecting a power shortage situation which is illustrated as 48, whereby the radio transmitter 46 is arranged to transmit a scheduling information signalling triggered by the power shortage situation to the RBS 15 so as to allow the RBS 15 to take a pre-determined action regarding the available radio resources.

The RBS 15 comprises a radio transmitter 42 and a receiver 41. The transmitter 42 is transmitting data to a receiver 47 of the user equipment 18 over the radio interface on the downlink channel 16. The receiver 41 is receiving data from the user equipment 18 on the uplink channel 17 and is, thus, arranged to receive the scheduling information signalling triggered by the power shortage situation in the user equipment 18 transmitted by the user equipment 18. The RBS 15 further comprises means 43 for taking a pre-determined action regarding the available radio resources. The RBS 15 also comprises an uplink scheduler 45, which decides transmission rights (grants) to the user equipment 18. The scheduler 45 is also responsible for some of the actions which may be performed when a power shortage situation occurs in the user equipment 18 as is described above. FIG. 4 is just an illustrative block diagram showing by example only different functions in a user equipment and a RBS respectively.

Given that there are methods to detect and signal a UE's power situation to the system, such information could be added as a trigger criteria for the SI signalling.

The 3GPP description (TS 25.309) as stated below should have another case added (in italics):

9.3.1.1.2 Triggers

In the case where the UE is not allowed to transmit scheduled data (because it has no Serving Grant available or it has received an Absolute Grant preventing it from transmitting in any process) and it has Scheduled data to send on a logical channel for which Scheduling Information must be reported:

Scheduling Information shall be sent to the Serving E-DCH RLS in a MAC-e PDU;

Periodic reporting to protect against NACK-to-ACK misinterpretation;

Scheduling Information could be sent alone, or with non-scheduled data, if such exist;

Scheduling Information will also be triggered if higher priority data arrives in buffer.

In the case where the UE is allowed to transmit scheduled data and it has Scheduled data to send on a logical channel for which Scheduling Information must be reported:

it shall send the Scheduling Information to the Serving E-DCH RLS in the MAC-e PDU;

the Scheduling Information is sent periodically (period defined by RRC);

*Scheduling Information will also be triggered if the UE, during some predefined period has suffered from power shortage.*

In the above description, "power shortage" means, for example that the UE's E-DPDCH power ($\beta_{ed}$) has been scaled down too much during a too long time.

Looking into the 3GPP Medium Access Control (MAC) protocol specification (TS 25.321), there are basically two separate cases; "how to proceed having no serving grant", and "how to proceed when serving grant is not equal to zero grant", which are found in section 11.8.1.6.1 and 11.8.1.6.2, respectively.

The description in section 11.8.1.6.2 should have the following triggering criteria added (in italic):

11.8.1.6.2 Report Triggering when SG < > "Zero_Grant" and at least one process is activated If an E-DCH serving cell change occurs and if the new E-DCH serving cell was not part of the previous Serving E-DCH RLS, the transmission of a Scheduling Information shall be triggered.

RRC can configure MAC with periodic triggering also for the case when the variable Serving_Grant < > "Zero_Grant" and at least one process is activated. The periodic trigger timer T_SIG (Timer Scheduling Information—different from "Zero_Grant") can be configured to a different value than T_SING.

T_SIG shall be started once the Serving_Grant variable becomes < > "Zero_Grant" and at least one process is activated.

When T_SIG expires, the transmission of a new Scheduling Information shall be triggered T_SIG shall be stopped and reset once the Serving_Grant variable in the Serving Grant Update function becomes equal to "Zero_Grant" or all processes are deactivated.

T_SIG shall be restarted when the transmission of a Scheduling Information is triggered.

Once the Serving_Grant variable in the Serving Grant Update function becomes equal to "Zero_Grant" or all processes are deactivated and TEBS is larger than zero, the transmission of a Scheduling Information shall be triggered.

When the Serving Grant variable in the Serving Grant Update function is larger the "Zero_Grant", all processes are activated, TEBS is larger than zero, and if the UE, during some predefined period has suffered from power shortage, the transmission of a Scheduling Information shall be triggered.

And as in previous description, "power shortage" means that the UE's E-DPDCH power ($\beta_{ed}$) has been scaled down too much during a too long time.

It will be appreciated that at least some of the procedures described above are carried out repetitively as necessary to respond to the time-varying characteristics of the channel between the transmitter and the receiver. To facilitate understanding, many aspects of the invention are described in terms of sequences of actions to be performed by, for example, elements of a programmable computer system. It will be recognized that the various actions could be performed by specialized circuits (e.g. discrete logic gates interconnected to perform a specialized function or application-specific integrated circuits), by program instructions executed by one or more processors, or a combination of both.

Moreover, the invention can additionally be considered to be embodied entirely within any form of computer-readable storage medium having stored therein an appropriate set of instructions for use by or in connection with an instruction-execution system, apparatus or device, such as computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus or device. The computer-readable medium can be, for example but not limited to, an electronic, magnetic, optical, electromagnetic, infrared, or semiconductor system, apparatus, device or propagation medium. More specific examples (a non-exhaustive list) of the computer-readable medium include an electrical connection having one or more wires, a portable computer diskette, a random access memory (RAM), a read only memory (ROM), an erasable programmable read only memory (EPROM or Flash memory), an optical fibre, a portable compact disc read only memory (CD-ROM), and a universal serial bus (USB) memory.

Modifications to embodiments of the invention described in the foregoing are possible without departing from the scope of the invention as defined by the accompanying claims.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural and vice versa.

Any numerals included within parentheses in the accompanying claims are intended to assist understanding of the claims and should not be construed in any way to limit subject matter claimed by these claims.

The invention claimed is:

1. A method in a user equipment of efficiently utilizing available radio resources in a communication network comprising communication network nodes supporting serving cells between which one or more user equipments are moving, said method comprising:
   detecting, based on a maximum transmission power of the user equipment, that the user equipment is experiencing a power shortage situation in which the user equipment does not have enough power to transmit at an intended transmit power level using a selected transport format; and
   transmitting a scheduling information signaling report triggered by said power shortage situation to a given one of the communication network nodes to allow the given communication network node to take a pre-determined action regarding the available radio resources;
   wherein the selected transport format is an Enhanced Dedicated Channel (E-DCH) Transport Format Combination (E-TFC) selected by the user equipment.

2. The method of claim 1, wherein the method further comprises transmitting another report to the given communication network node when said power shortage situation has been resolved.

3. A method of efficiently utilizing radio resources in a communication network comprising communication network nodes supporting serving cells between which one or more user equipments are moving, said method being performed by a first one of the at least one communication network nodes and comprising:
   receiving a scheduling information signaling report triggered by a power shortage situation in a user equipment in which a maximum transmission power of the user equipment is less than a transmission power needed to transmit at an intended transmit power level using a selected transport format, the report being received from either the user equipment, or from a second one of the communication network nodes; and
   taking a pre-determined action regarding the available radio resources responsive to receiving the scheduling information signaling report;
   wherein the selected transport format is an Enhanced Dedicated Channel (E-DCH) Transport Format Combination (E-TFC) selected by the user equipment.

4. The method of claim 3, wherein said pre-determined action comprises freezing a signal-to-interference target upon receiving said scheduling information signaling report during a power shortage period in which the power shortage situation occurs.

5. The method of claim 3, wherein said pre-determined action comprises adjusting an assigned grant upon receiving said scheduling information signaling report during a power shortage period in which the power shortage situation occurs.

6. The method of claim 5, further comprising:
using said grant adjustment to increase bit rates for other user equipments in a serving cell supporting the user equipment.

7. The method of claim 3, further comprising:
reducing a maximum allowed load in a serving cell supporting the user equipment upon receiving said scheduling information signaling report from more than one user equipment.

8. The method of claim 3, further comprising:
forwarding said scheduling information signaling report to a second one of the communication network nodes;
whereby said second communication network node is arranged to take at least one of the following actions regarding the available radio resources:
freezing a signal-to-interference target upon receiving said report during a power shortage period in which the power shortage situation occurs; and
if power shortage situations are reported frequently, controlling inter-cell interference.

9. A user equipment operative to efficiently utilize available radio resources in a communication network comprising communication network nodes supporting serving cells between which said user equipment is moving, said user equipment comprising:
a processing circuit configured to:
detect, based on a maximum transmission power of the user equipment, that the user equipment is experiencing a power shortage situation in which the user equipment does not have enough power to transmit at an intended transmit power level using a selected transport format; and
generate a scheduling information signaling report triggered by said power shortage situation; and
a transmitter configured to transmit the scheduling information signaling report to a given one of the communication network nodes, so as to allow the given communication network node to take a pre-determined action regarding the available radio resources;
wherein the selected transport format is an Enhanced Dedicated Channel (E-DCH) Transport Format Combination (E-TFC) selected by the user equipment.

10. The user equipment of claim 9, wherein the transmitter is further configured to:
transmit another report to the given communication network node when said power shortage situation has been resolved.

11. A communication network node operative to efficiently utilize radio resources in a communication network comprising a plurality of communication network nodes supporting serving cells between which one or more user equipment are moving, said communication network node comprising:
a receiver configured to receive a scheduling information signaling report triggered by a power shortage situation in a user equipment in which a maximum transmission power of the user equipment is less than a transmission power needed to transmit at an intended transmit power level using a selected transport format; and
a processing circuit configured to take a pre-determined action regarding the available radio resources responsive to receiving the scheduling information signaling report;
wherein the selected transport format is an Enhanced Dedicated Channel (E-DCH) Transport Format Combination (E-TFC) selected by the user equipment.

12. The communication network node of claim 11, wherein the communication network node is configured to freeze a signal-to-interference target, as said pre-determined action, upon receiving said scheduling information signaling report during a power shortage period in which the power shortage situation occurs.

13. The communication network node of claim 11, wherein the communication network node is configured to adjust an assigned grant to said user equipment, as said pre-determined action, upon receiving said scheduling information signaling report during a power shortage period in which the power shortage situation occurs.

14. The communication network node of claim 13:
wherein a given one of the serving cells supports the user equipment; and
wherein the communication network node is further configured to use said grant adjustment to increase bit rates for other user equipments in the given cell.

15. The communication network node of claim 11:
wherein a given one of the serving cells supports the user equipment; and
wherein the communication network node is further configured to reduce a maximum allowed load in the given cell upon receiving said scheduling information signaling report from more than one user equipment.

16. The communication network node of claim 11:
wherein the communication network node is further configured to forward said scheduling information signaling report to a second communication network node; and
wherein said second communication network node is arranged to take at least one of the following actions regarding the available radio resources:
freezing a signal-to-interference target upon receiving said report during a power shortage period in which the power shortage situation occurs; and
if power shortage situations are reported frequently, controlling inter-cell interference.

* * * * *